United States Patent Office 2,767,222
Patented Oct. 16, 1956

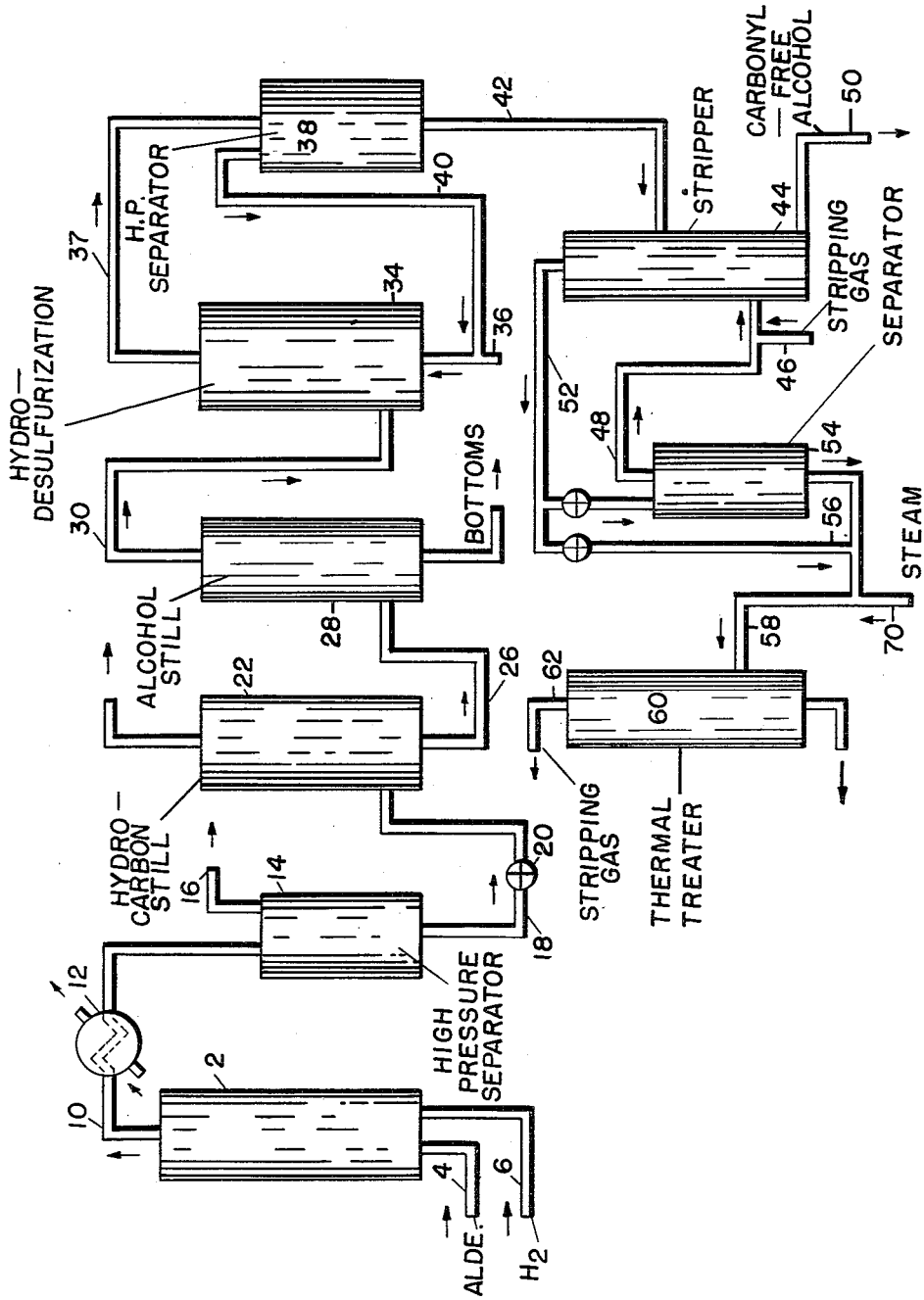

2,767,222

HYDRODESULFURIZATION OF OXO ALCOHOLS

Ralph B. Mason and Fred J. Buchmann, Baton Rouge, La., assignors to Esso Research and Engineering Company, a corporation of Delaware Application January 22, 1953, Serial No. 332,738

7 Claims. (Cl. 260—643)

The present invention relates to a process for purifying oxygenated organic compounds prepared by the carbonylation of olefinic compounds in the presence of a carbonylation catalyst which are subsequently hydrogenated to form alcohols. More specifically, the present invention relates to an improved method for purification of primary alcohols by treatment with hydrogen in the presence of a sulfur- and carbon monoxide-sensitive catalyst, such as nickel. Still more specifically, the present invention relates to a hydrodesulfurization reaction carried out in the presence of carbon monoxide-containing hydrogen gas streams.

Primary alcohols prepared by the Oxo process are of great economic importance and of commercial interest because of their use as intermediates in the manufacture of plasticizers of the diester type by esterification with dibasic acids. Previously, these alcohols have been supplied mainly by such comparatively costly procedures as aldol condensation of butyraldehydes, followed by dehydration and hydrogenation of the resulting unsaturated octyl aldehyde.

The synthesis of oxygenated organic compounds from olefinic compounds and mixtures of carbon monoxide and hydrogen under suitable conditions is well known in the art. The olefinic starting material is allowed to react in the liquid state with carbon monoxide and hydrogen in the presence of a metal catalyst, usually an iron group metal catalyst, such as a suitable cobalt compound to form, in a first or oxonation stage, organic carbonyl compounds such as aldehydes having one carbon atom more per molecule than the olefinic feed material together with some condensed higher molecular weight products such as ethers, acetals, hemiacetals, and esters. The carbonyl compounds which predominate in the product are then subjected to a single hydrogenation to produce the corresponding alcohols, usually in a rather impure state.

Practically all types of organic compounds having an olefinic double bond may be used as starting materials to the first or oxonation stage, including aliphatic olefins and diolefins, cyclo-olefins, aromatics with olefinic side chains, oxygenated compounds having olefinic double bonds, etc. The metal catalyst is preferably used in the form of a fatty acid salt soluble in the olefinic feed stock, such as the naphthenates, stearates, oleates, etc. of cobalt. Suitable general reaction conditions include temperatures of about 150°–450° F., pressures of about 100 to 300 atm., $H_2:CO$ ratios of about 0.5–4.0:1, liquid feed rates of about 0.2–5 v./v./hr. and gas feed rates of about 1,000–45,000 standard cu. ft. of $H_2+CO$ per barrel of liquid olefinic feed.

The primary hydrogenation stage may be operated at conventional hydrogenation conditions which include temperatures, pressure, gas and liquid feed rates approximately within the ranges specified above for the first stage. Various known types of hydrogenation catalysts, including nickel, tungsten, molybdenum, but preferably in the form of their oxides and sulfides, and others may be used. The liquid product from the primary hydrogenation stage is worked up by distillation to separate the desired alcohols from unconverted olefinic feed material, unhydrogenated carbonyl compounds, and hydrocarbons formed in the process. The sulfactive sulfide catalysts have been found to be especially useful for carrying out this hydrogenation.

The over-all carbonylation or so-called "Oxo" reaction as outlined above provides a particularly effective method for preparing valuable primary alcohols, particularly of the $C_4$ to $C_{20}$ range, which find large markets as intermediates for detergents and plasticizers. The $C_8$ and $C_9$ Oxo alcohol products are especially preferred for use in forming esters to be used as plasticizers in light-colored or colorless plastics and resins.

Serious difficulties have been encountered in the primary hydrogenation stage as a result of sulfur poisoning of certain hydrogenation catalysts, when the catalysts used are those such as elementary nickel and others which are sulfur-sensitive. The most readily available olefinic feed stocks for the oxonation reaction are selected hydrocarbon streams derived from petroleum refinery sources and these frequently have sulfur contents as high as 0.1% or even higher. Furthermore, there are a variety of other ways in which sulfur may be introduced into the alcohol product during both the oxonation and hydrogenation stages for reducing the carbonyl compounds. For instance, the fatty acids used to form the metal oxonation catalyst for the purpose of introducing the metal into the reactor as the metallic naphthenate, stearate, or oleate, will usually be found to contain small amounts of sulfur-containing compounds as contaminants, particularly when the fatty acids themselves are of petroleum origin as they frequently are. The synthesis gas used in the oxonation zone which is primarily a mixture of carbon monoxide and hydrogen also may contain sulfur impurities and, in fact, the gaseous reactants employed in both stages of the Oxo reaction usually contain at least traces of sulfur impurities.

Sulfur which is present in the crude reaction mixture containing the carbonyl compounds tends to be carried through the oxonation stage into the hydrogenation stage where it combines with the hydrogenation catalyst to diminish and even completely destroy catalyst activity unless sulfur-insensitive catalysts are used. The sulfur-sensitive hydrogenation catalysts are generally of the elementary metallic type and the deactivating effect of the sulfur on their activity requires frequent reactivation, catalyst replacement, and increased amounts of a catalyst whose cost is definitely a commercial factor and may be prohibitively high. Thus, it has been considered necessary for optimum operation in the hydrogenation step to employ a sulfur-insensitive catalyst. These sulfur-insensitive catalysts include particularly certain metallic sulfide hydrogenating catalysts, examples of such catalysts being nickel sulfide, molybdenum sulfide, tungsten sulfide, and mixtures thereof. While these catalysts have the decided advantage of avoiding the inactivation due to sulfur content of the feed stock, they also possess the disadvantage of permitting much of the sulfur to pass unchanged through the hydrogenation zone and, indeed, in many instances, tend to introduce additional sulfur contamination into the alcohol. Thus, the final crude alcohol products may have a total sulfur content of from 30–100 parts per million and higher.

One of the largest and most important uses developed for the synthetic alcohol products is that of producing esters suitable for plasticizers, by reaction with aliphatic, alicyclic, and aromatic acids or anhydrides, including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols from $C_4$ to $C_{20}$ range such as the butyl alcohols, the octanols, and the nonanols.

These esters are prepared in standard type esterification equipment employing reactors made of stainless steel or other metal, or, in some cases, in glass-lined reaction vessels. In some instances, particularly when the esters were produced in reactors having metallic surfaces exposed to the reacting mixtures, the products were found to be deficient as to the standards required for plasticizers, in such characteristics as odor, color, and plasticizing qualities such as the poor weathering tendency of the resins and plastics in which such plasticizers are used. These undesirable characteristics are believed to be primarily caused by impurities present in the alcohol product and certain of these are caused particularly by the sulfur products present in the alcohol, although other materials which can affect ester color and odor include polymerized and condensed higher molecular weight impurities as well as unreduced carbonyl compounds and other non-alcoholic compounds. It has further been discovered that when sulfur compounds, especially those of the acidic type, are allowed to remain in impure alcohol or aldehyde, they act as catalysts for causing increased condensation reactions which produce acetals and other high molecular weight impurities of the undesirable type. In fact, it has been found that, in order to obtain a high grade alcohol which adequately meets all specifications, the active, color-producing sulfur content should best be reduced to a value somewhere near five parts per million, although somewhat higher total sulfur concentrations can be tolerated, the exact limit of tolerance depending upon the form in which the sulfur occurs.

In general, the sulfur in the synthetic Oxo alcohols is in the form of organically combined sulfur. Although all types of organic impurities in which the sulfur occurs have not been fully determined, it is believed that the sulfur is present in a variety of forms and that it is generally deleterious in most forms when occurring in the final alcohol. Sulfur-containing contaminants cause both odor and color problems as well as act as accelerators to give unwanted properties to the alcohols. The finished alcohol should contain a minimum of sulfur-containing compounds.

An excellent means of purifying and removing sulfur from the distilled alcohol product prepared in the manner described has been the treatment of the alcohol product with additional hydrogen in the presence of an active catalyst, such as nickel, at relatively moderate conditions of temperature and pressure to avoid overhydrogenation of the alcohol. The catalyst is of the sulfur-sensitive type, to insure the removal of sulfur, and may include nickel, copper, cobalt metal. They are used in a finely divided form to present a large contact surface, and by their use a substantially sulfur-free alcohol product is obtainable. The second hydrogenation, or hydrodesulfurization, is preferably carried out at relatively low pressures of atmospheric to 500 p. s. i. g. and temperatures of 100 to 400° F. It was found that alcohol products which, prior to the hydrodesulfurization treatment, had sulfur contents of 10 to 30 parts per million could be reduced to a sulfur content of 2 to 6 parts per million, and a corresponding improvement in ester color could also be obtained. The ester color is a measurement of the optical density of the phthalate ester and is unsatisfactorily high when the alcohol contains even relatively small amounts of sulfur impurities.

Beneficial as the hydrodesulfurization process is in decreasing the sulfur content of the alcohol, its application has been accompanied by certain difficulties. First and foremost is the fact that the most active hydrodesulfurization catalysts, such as nickel, not only are sulfur-sensitive, which is a desirable quality, but are also carbon monoxide sensitive, which is highly undesirable. Commercial hydrogen contains significant quantities of carbon monoxide, usually 2 to 3%. Employing such gas in the hydrodesulfurization reaction with nickel catalyst results, under the reaction conditions, in the formation of nickel carbonyl. This property naturally depletes the catalyst, but more seriously still, results in the contamination of the alcohol product with this material; subsequent distillation of the reaction product in the still causes decomposition of the $Ni(CO)_4$, fouling the equipment, and depositing nickel therein which, in the presence of the alcohol product, results in conversion of significant amounts of the latter to the aldehyde and the hydrocarbon by dehydrogenation and dehydration under the distillation conditions. Thus, hitherto, in practicing hydrodesulfurization technique in the presence of carbon monoxide-sensitive catalysts, it has been the practice to employ either electrolytically prepared hydrogen or methanized hydrogen. The latter is prepared by passing commercial hydrogen over a catalyst to reduce the CO to $CH_4$, and requires elaborate and careful control. Both methods are almost prohibitively expensive.

It is one of the purposes of the present invention to provide an improved means for hydrodesulfurizing the Oxo alcohol product in the presence of a CO-sensitive catalyst whereby commercial hydrogen, and specifically carbon monoxide-containing hydrogen, may be employed.

It is also a purpose of the present invention to carry out alcohol hydrodesulfurization under conditions such that overhydrogenation is minimized.

Other objects and advantages of the invention will appear hereinafter.

In accordance with the present invention, the difficulties inherent in the formation of volatile carbonyls by reaction of the nickel hydrodesulfurization catalyst with CO-containing gas streams are overcome by stripping out the carbonyls from the alcohol product with hydrogen at essentially the same temperature, or lower, as that obtaining in the hydrodesulfurization zone. The gas stream, containing the metal carbonyl, $H_2$, and some alcohol vapor are thereafter passed to the thermal treating zone wherein the carbonyl is decomposed to the corresponding metal, such as nickel, and carbon monoxide is liberated.

In one modification of the invention, the decomposition zone is maintained under conditions whereby the CO liberated is converted to methane by the nickel or other catalyst which has been deposited in that zone, in the presence of the large excess of hydrogen present. This methanized hydrogen is recycled to the hydrodesulfurization zone to augment the CO-contaminated commercial hydrogen used in the process.

The gas purging operation is always accompanied by some carry-over of alcohol vapors from the hydrodesulfurization zone. In the course of the decomposition of the carbonyl, a portion of this alcohol product becomes converted, as a result of dehydration and dehydrogenation, into the corresponding olefin and aldehyde. These materials are returned to the corresponding carbonylation and hydrogenation stages.

The amount of sulfur in alcohol product being very small, only a relatively small hydrogen circulation is required, and substantially total gas recycle is desirable, for thus the catalyst life is prolonged, by minimizing nickel carbonyl formation. The system combining a low temperature hydrodesulfurization section with a high temperature carbonyl decomposition section permits operation with CO-containing gases at low catalyst temperatures, which operation is ordinarily not feasible. The high temperature zone contains no catalyst other than that from decomposed carbonyls, which reduces the degree of overhydrogenation in this section, particularly in view of the relatively small amount of alcohol product in the vapor phase.

The present invention and its applications will best be understood from the more detailed description hereinafter, wherein reference will be had to the accompanying drawing, which is a schematic representation of a system suitable for carrying out preferred embodiments of the invention. As the latter resides in the treatment of the alcohol product from the aldehyde hydrogenation step and finds its highest utility when a sulfactive catalyst is employed in that stage, the carbonylation and decobalting are not shown.

Referring now to the drawing, liquid aldehyde product substantially free of dissolved cobalt, and which may contain as much as 0.005% sulfur, is passed to the lower portion of hydrogenator 2 via line 4. Simultaneously, commercial hydrogen is supplied to reactor 2 through line 6 in amounts sufficient to convert the aldehyde product into the corresponding alcohols. The catalyst within reactor 2 is preferably a sulfactive one; an excellent catalyst is one comprising molybdenum sulfide supported on an activated carbon support. Hydrogenator 2 may be operated at pressures of from about 2500–4500 p. s. i. g. and temperatures of from about 400° to 550° F., and a liquid feed rate of about 0.25 to 2 v./v./hr. It is also beneficial to add to the hydrogenation zone up to 1–10% of water, to aid in selectivity to alcohol product.

The products of the hydrogenation reaction are withdrawn overhead through line 10, then passed through cooler 12 into high pressure separator 14, where unreacted hydrogen may be withdrawn overhead through line 16 for further use in the system. Liquid products are withdrawn from separator 14 through line 18 and are passed to still 22 through pressure release valve 20. As pointed out, the crude alcohol product has a comparatively high sulfur content of 10–30 parts per million. If relatively freshly prepared catalyst is employed, the sulfur content may be even higher. This is true even if the aldehyde feed to the hydrogenation zone 2 had a lower sulfur content. In still 22 the low boilers, mostly hydrocarbons boiling below the desired alcohol product, are distilled overhead. Thus, when a $C_7$ olefin fraction is the feed to the carbonylation zone, generally the product boiling up to about 340° F. is removed as a heads cut in still 22 and used as fuel blending agent.

The bottoms from this primary distillation are withdrawn through line 26 and passed to alcohol still 28, where product alcohol is removed overhead through line 30 by distillation at atmospheric or reduced pressures. The bottoms from the distillation may be further processed, or used as fuel.

The recovered alcohol product, containing excessive quantities of sulfur in solution, is passed via line 30 into the lower portion of hydrodesulfurization reactor 34. In zone 34, the alcohol product is contacted with a sulfur-sensitive catalyst, such as nickel, cobalt, platinum, palladium, copper and the like, in the presence of commercial hydrogen introduced through line 36 and recycle hydrogen. The reaction conditions within 34 include pressures in the range of atmospheric to 3000 p. s. i. g., preferably atmospheric to 500 p. s. i. g., and temperatures in the range of 100 to 400° F., preferably 200 to 300° F. The hydrogen throughput based on alcohol is 10 to 500 C. F./B. This fresh hydrogen admitted through line 36 may contain up to 5% CO.

The liquid and gaseous product from the hydrodesulfurization zone is passed via line 37 to a gas-liquid separation zone 38. The hydrogen gas separated in said zone is preferably completely recycled to reactor 34 via lines 40 and 36. This gas contains some nickel carbonyl, which is extracted and dissolved by further contacting with alcohol product in the hydrodesulfurization zone. Complete recycle decreases the amount of additional make-up, i. e., fresh hydrogen required, and thus minimizes nickel catalyst losses.

The liquid product withdrawn from the separation zone 38 is passed via line 42 to gas stripping zone 44. The liquid product, though substantially completely free of sulfur, contains in solution significant amounts of the carbonyl of the hydrodesulfurization catalyst, such as nickel carbonyl. Stripping gas is now introduced into vessel 44 through lines 46 and 48. As a stripping gas there may be employed $H_2$, CO, mixtures of $H_2$ and CO, nitrogen, methane, and the like. Temperatures for stripping depend upon the nature of the carbonyl, and the pressure in the zone. Thus suitable reaction conditions within 44 include temperatures of 50 to 400° F. and pressures of from 15 to 500 p. s. i. g. If nickel carbonyl is stripped, temperatures from 50–250° F. and pressures from 15–100 p. s. i. g. are suitable.

The stripped alcohol product, now free of dissolved carbonyl as well as sulfur, is withdrawn from stripper 44 through line 50, and is now ready for employment in processes requiring a high purity alcohol. Gaseous products containing a minor amount of vaporized and entrained alcohol is withdrawn overhead through line 52 and may be passed, if desired, to another gas-liquid separator 54. A portion of the gas removed in this separation zone may be recycled to stripper 44 via line 48. However, it may be desirable to bypass separator 54 and pass the total gas and vapor stream through lines 56 and 58 into thermal treating zone 60.

Zone 60 is maintained at a temperature level of 400 to 800° F., preferably 500 to 700° F. In the thermal zone, nickel carbonyl is completely decomposed into carbon monoxide and the metal, which deposits in the reactor. Heating may be by any suitable means, as electrical means, steam coils, and the like. The small amount of alcohol product carried into zone 60 is converted as a result of interaction with the deposited nickel, into aldehyde and olefin. The amount of alcohol thus carried over is usually very small, not more than about 1% of the amount treated by the hydrodesulfurizing technique. Olefin and aldehydes thus produced may advantageously be recycled to the corresponding carbonylation and hydrogenation stages. This is particularly advantageous where the stripping gases are hydrogen or a mixture of $H_2$ and CO. Thus, where the stripping gas admitted through 46 is any mixture of $H_2+CO$, olefin product plus the stripping gas fortified with the CO resulting from decomposition of $Ni(CO)_4$, may be sent to the Oxo stage. If the stripping gas is commercial hydrogen, passage through the thermal zone results in some hydrogenation of the carbon monoxide, resulting in at least partial methanization. This gas, after removal of liquid products, may be passed to the hydrodesulfurization stage via lines 62 and 36 and provides a gas with minimum catalyst poisoning components.

The process of the present invention may be subject to many modifications obvious to those skilled in the art. Thus, under certain circumstances, it may be desirable to maintain a sulfur sensitive and CO sensitive hydrogenation catalyst both in the aldehyde hydrogenation and in the hydrodesulfurization zones. Also, under certain circumstances, it may be desirable to pass the entire crude alcohol product prior to distillation directly into the hydrodesulfurization zone, and distill only the alcohol hydrodesulfurized and stripped according to the present invention.

In still another modification of the present invention steam or water vapor is introduced along with the feed to thermal reactor 60 through line 70. The steam thus admitted, which may in amount be varied widely from 1 to 10% of the material passed to zone 60, serves the dual function of minimizing dehydration-dehydrogenation of the entrained alcohol vapors, and also serves to remove carbon monoxide by the water gas shift reaction $CO+H_2O \rightleftharpoons CO_2+H_2$, which reaction is favored under the temperatures obtaining in zone 60. When steam is thus admitted, the effluent from the thermal unit 60 may be passed through a condenser, the gas separated and passed to the hydrodesulfurization or stripping zone, the alcohol product separated from water, and the alcohol product combined with the main alcohol product withdrawn from 44 via line 50.

The invention may be further illustrated by the following specific examples.

EXAMPLE I

Studies on a continuous operation in which isoctyl alcohol is prepared by the catalytic hydrogenation of an oxonation product using a sulfide catalyst in the initial hydrogenation and a sulfur-sensitive catalyst in the second hydrogenation are shown in Table I below. In this tests, UOP nickel catalyst was employed in carrying out the second hydrogenation. In each case, there is a marked reduction in sulfur content of the treated alcohol and a substantial improvement in ester color of phthalate ester prepared from the desulfurized alcohol.

*Table I*

CONTINUOUS OPERATION WITH SULFIDE CATALYST IN FIRST STAGE AND SULFUR-SENSITIVE CATALYST IN SECOND STAGE

| | Feed 1 | A | B | Feed 2 | C | D |
|---|---|---|---|---|---|---|
| Avg. Temp., °F | | 290 | 290 | | 290 | 300 |
| Liquid, v./v./hr | | 1.0 | 4.0 | | 1.0 | 4.0 |
| Light Ends, Wt. percent | | 0.46 | 0.33 | | 0.58 | 0.51 |
| Sulfur, p. p. m | 8 | 1-3 | 4 | 5 | 0-3 | 3-4 |
| Ester Color | 0.15 | 0.03-0.05 | 0.06 | 0.09-0.13 | 0.03-0.04 | 0.04-0.08 |

EXAMPLE II

As further evidence of color improvement resulting from hydrodesulfurization, recycle esterification tests were carried out on alcohol which had been subjected to a hydrodesulfurization treatment at 300° F. and 1 v./v./hr. at a catalyst age of 600 hours. The tests involved recycle of the stainless steel filings used in the esterification test and therefore represent severe conditions such as would be encountered in plant esterification operations. The excellent properties of the hydrodesulfurized alcohol are illustrated in Table II shown below, in which the light absorbency of the total phthalate esters prepared from the various recycled alcohols are summarized.

*Table II*

LIGHT ABSORBENCY AT 4470 A. OF TOTAL PHTHALATE ESTERS

| Ester Product of Hydrodesulfurized Alcohol | Cycle | Ester Product of Untreated Alcohol |
|---|---|---|
| 0.09 | 1 | 0.09 |
| 0.04 | 2 | 0.32 |
| 0.07 | 3 | 0.42 |
| 0.07 | 4 | 0.34 |
| 0.08 | 5 | 0.29 |

The advantage of hydrodesulfurizing a sulfur-contaminated alcohol product with a CO-containing hydrogen gas over treating the same with a CO-free gas, in the presence of a CO and sulfur sensitive catalyst is brought out in the following example.

EXAMPLE III

It has been found that though Ni(CO)₄ is undesirable in distillation of alcohols, it is a desulfurizing agent in its own right. In a pilot scale experiment, 0.08% nickel carbonyl was added to an isooctyl alcohol product having a chip ester color value of 0.16. A sample of the product was thereupon freed of Ni(CO)₄ by stripping with nitrogen for 7 hours at room temperature at a rate of about 1 cu. ft./hour. The alcohol product thus treated had an ester color of 0.08, which made it suitable for plasticizing purposes, whereas the alcohol prior to this treatment was not suitable for making esters to be used as colorless plasticizers.

This experiment points out that the hydrogen used in hydrodesulfurizing alcohols does not require removal of carbon monoxide, but rather that nickel carbonyl per se is an effective desulfurizing agent, when added as such or prepared in situ.

What is claimed is:

1. An improved process for hydrodesulfurizing a sulfur-contaminated alcohol product prepared by the carbonylation of olefins in the presence of a cobalt catalyst to form an aldehyde product which thereafter is hydrogenated to form said sulfur-contaminated alcohol product which comprises passing said impure alcohol product to a hydrodesulfurization zone, maintaining in said zone a catalyst which forms metal carbonyls in the presence of carbon monoxide, passing into said zone a carbon monoxide comprising hydrogen gas, maintaining a pressure of about atmospheric to 3000 p. s. i. g., and a temperature of 100° to 400° F., in said zone, converting at least a portion of said catalyst in said hydrodesulfurization zone to the metal carbonyl, withdrawing a mixture comprising effluent gases and a liquid product substantially free of sulfur compounds from said zone, passing said mixture to a gas liquid separation zone, separating said liquid substantially free of sulfur and containing in solution metal carbonyl from said effluent gases, recycling at least a portion of said gases to said hydrodesulfurization zone, passing said liquid and dissolved metal carbonyl to a stripping zone, maintaining a temperature of from about 50° to 400° F. and a pressure of from about atmospheric to about 500 p. s. i. g. in said zone, stripping metal carbonyl from the alcohol liquid in said zone, recovering an alcohol product substantially completely free of sulfur and dissolved metal carbonyl from said zone, withdrawing stripping gas and metal carbonyl from said zone, passing said stripping gas to a thermal treating zone at a temperature of from about 400° to about 800° F., heating said gas stream in said zone to decompose said metal carbonyl, and recovering a carbon-monoxide containing gas from said last named zone.

2. The process of claim 1 wherein the carbon monoxide produced on decomposing said metal carbonyl is hydrogenated in the presence of the metal resulting from said decomposition to produce a methane-comprising gas.

3. The process of claim 2 wherein said methane-comprising gas is passed to said desulfurization zone.

4. The process of claim 1 wherein said hydrodesulfurization catalyst comprises nickel and said metal carbonyl is nickel carbonyl.

5. The process of claim 1 wherein steam is added to said thermal zone and said carbon monoxide is converted at least in part to carbon dioxide.

6. The process of claim 1 wherein carbonyls are stripped out of said carbonyl containing alcohol product at a temperature no higher than that prevailing in said hydrodesulfurization zone.

7. An improved process for hydrodesulfurizing a sulfur contaminated alcohol which comprises treating a sulfur contaminated alcohol with a minor amount of nickel carbonyl, and thereafter passing a stripping gas to said treated alcohol product, stripping out said nickel carbonyl and recovering a high quality alcohol product.

References Cited in the file of this patent

UNITED STATES PATENTS

| | | |
|---|---|---|
| 2,464,916 | Adams et al. | Mar. 22, 1949 |
| 2,525,354 | Hoog et al. | Oct. 10, 1950 |
| 2,557,701 | Smith | June 19, 1951 |
| 2,569,671 | Hughes et al. | Oct. 2, 1951 |
| 2,585,816 | Mertzweiller | Feb. 12, 1952 |
| 2,638,488 | Cerveny | May 12, 1953 |
| 2,700,687 | Catterall | Jan. 25, 1955 |

OTHER REFERENCES

Groggins: Unit Processes in Org. Chem. (4th ed.), McGraw-Hill, N. Y. (1952), pp. 561–4.